United States Patent
Tan

(10) Patent No.: US 12,093,107 B2
(45) Date of Patent: Sep. 17, 2024

(54) POWER CONTROL FOR A DEVICE TO MEET AN EXPECTED OPERATION DURATION

(71) Applicant: APUTURE IMAGING INDUSTRIES CO., LTD., Guangdong (CN)

(72) Inventor: Tianze Tan, Guangdong (CN)

(73) Assignee: APUTURE IMAGING INDUSTRIES CO., LTD., Shenzhen (CN)

( * ) Notice: Subject to any disclaimer, the term of this patent is extended or adjusted under 35 U.S.C. 154(b) by 162 days.

(21) Appl. No.: 17/890,288

(22) Filed: Aug. 18, 2022

(65) Prior Publication Data

US 2023/0195206 A1    Jun. 22, 2023

(30) Foreign Application Priority Data

Dec. 17, 2021    (CN) .......................... 202111549471.4

(51) Int. Cl.
*G06F 1/3212* (2019.01)
*G06F 1/3203* (2019.01)
*G06F 1/3296* (2019.01)
*H02J 7/00* (2006.01)

(52) U.S. Cl.
CPC .......... *G06F 1/3212* (2013.01); *G06F 1/3203* (2013.01); *G06F 1/3296* (2013.01); *H02J 7/0048* (2020.01); *H02J 7/007182* (2020.01)

(58) Field of Classification Search
CPC .... G06F 1/3296; G06F 1/3203; G06F 1/3212; H02J 7/007182; H02J 7/0048
USPC .......................... 713/300; 320/127, 133, 135
See application file for complete search history.

(56) References Cited

U.S. PATENT DOCUMENTS

| | | | |
|---|---|---|---|
| 9,886,076 B2* | 2/2018 | Woo | G06F 1/329 |
| 2006/0015758 A1* | 1/2006 | Yoon | G06F 1/3203 713/300 |
| 2009/0094473 A1* | 4/2009 | Mizutani | G06F 1/3203 713/340 |
| 2010/0315249 A1* | 12/2010 | Imai | G06F 1/3212 340/636.12 |
| 2013/0138989 A1* | 5/2013 | Jang | G06F 1/28 324/426 |
| 2022/0181903 A1* | 6/2022 | Luo | H02J 7/00032 |

FOREIGN PATENT DOCUMENTS

| | | |
|---|---|---|
| CN | 102195304 A | 9/2011 |
| CN | 111391610 A | 7/2020 |
| CN | 111835904 A | 10/2020 |

\* cited by examiner

*Primary Examiner* — Ji H Bae

(57) ABSTRACT

The present application provides a method and an apparatus for controlling device operation, and a terminal device and a storage medium, and relates to the technical field of device control. The method includes: acquiring an input expected operation duration of a target device; calculating to obtain a target power of the target device according to the expected operation duration and a target battery voltage of the target device; and controlling the target device to operate at the target power, wherein when the target device operates at the target power, an operable duration of the target device is greater than or equal to the expected operation duration. By means of the solutions provided by the present application, the operation of the device can be better controlled, so that the requirement of a user for service time required by continuous operation of the target device is met.

14 Claims, 7 Drawing Sheets

According to expected operation duration and a target battery voltage, select a target discharge curve from at least one discharge curve established in advance; wherein the at least one discharge curve is used for representing the relation between a device operation duration and a battery voltage, and each discharge curve corresponds to one device operation power ⸺ S21

Determine the device operation power corresponding to the target discharge curve as the target power ⸺ S22

Fig. 2

POWER CONTROL FOR A DEVICE TO MEET AN EXPECTED OPERATION DURATION

CROSS REFERENCE TO RELATED APPLICATIONS

The present application claims the benefit of Chinese Patent Application No. 202111549471.4 filed on Dec. 17, 2021, the contents of which are incorporated herein by reference in their entirety.

FIELD OF THE INVENTION

The present application belongs to the technical field of device control, in particular to a method and an apparatus for controlling device operation, and a terminal device and a storage medium.

BACKGROUND OF THE INVENTION

In order to enable target devices such as dimmable LED lamps, color-temperature-variable illumination lamps and cameras to continue to provide services for users after being disconnected from a wired power supply, the target devices are typically configured with batteries.

However, during use of the target devices, it is often the case that a battery power supply is not sufficiently charged to support the required service time, resulting in a failure to carry out the work well on the basis of the target device.

SUMMARY OF INVENTION

An embodiment of the present application provides a method and an apparatus for controlling device operation, and a terminal device and a storage medium, so as to solve the problems that it is often the case that a battery power supply is not sufficiently charged to support the required service time when an existing device is used, resulting in a failure to carry out the work well on the basis of a target device.

In a first aspect, an embodiment of the present application provides a method for controlling device operation, including:

acquiring an input expected operation duration of a target device;
calculating to obtain a target power of the target device according to the expected operation duration and a target battery voltage of the target device; and
controlling the target device to operate at the target power; wherein when the target device operates at the target power, an operable duration of the target device is greater than or equal to the expected operation duration.

According to the method for controlling the device operation provided by the embodiment of the present application, the input expected operation duration of the target device is acquired, and the target power of the target device is obtained by calculation according to the expected duration and the target battery voltage of the target device, so that the expected operation duration of the target device at the target power can be well controlled, and the requirement of a user for the required service time of the target device in continuous operation is met.

In a second aspect, an embodiment of the present application provides an apparatus for controlling device operation, including:

an acquiring module, used for acquiring the input expected operation duration of a target device;
a calculating module, used for calculating to obtain the target power of the target device according to the expected operation duration and the target battery voltage of the target device; and
a control module, used for controlling the target device to operate at the target power, wherein when the target device operates at the target power, the operable duration of the target device is greater than or equal to the expected operation duration.

In a third aspect, an embodiment of the present application provides a terminal device, including a battery, a memory, a processor and a computer program stored in the memory and capable of operating on the processor, and the method is implemented when the processor executes the computer program.

In a fourth aspect, an embodiment of the present application provides a computer readable storage medium, the computer readable storage medium is stored with a computer program, and the method for controlling device operation is implemented when the computer program is executed by the processor.

In a fifth aspect, an embodiment of the present application provides a computer program product, and when the computer program product operates on the terminal device, the terminal device executes any method for controlling device operation in the first aspect.

It can be understood that, for the beneficial effects of the second aspect to the fifth aspect, reference may be made to the relevant description in the first aspect, and details are not described herein again.

BRIEF DESCRIPTION OF THE DRAWINGS

In order to more clearly illustrate the technical solutions in the embodiments of the present application, the drawings required to be used in the embodiments or the prior art description will be briefly described below, and it is obvious that the drawings in the following description are only some embodiments of the present application, and for those skilled in the art, other drawings may be obtained according to these drawings without inventive labor.

FIG. 2 is a flow diagram illustrating a specific implementation of step S12 of the method for controlling device operation according to an embodiment of the present application.

DETAILED DESCRIPTION OF ILLUSTRATED EMBODIMENTS

Figure 1:
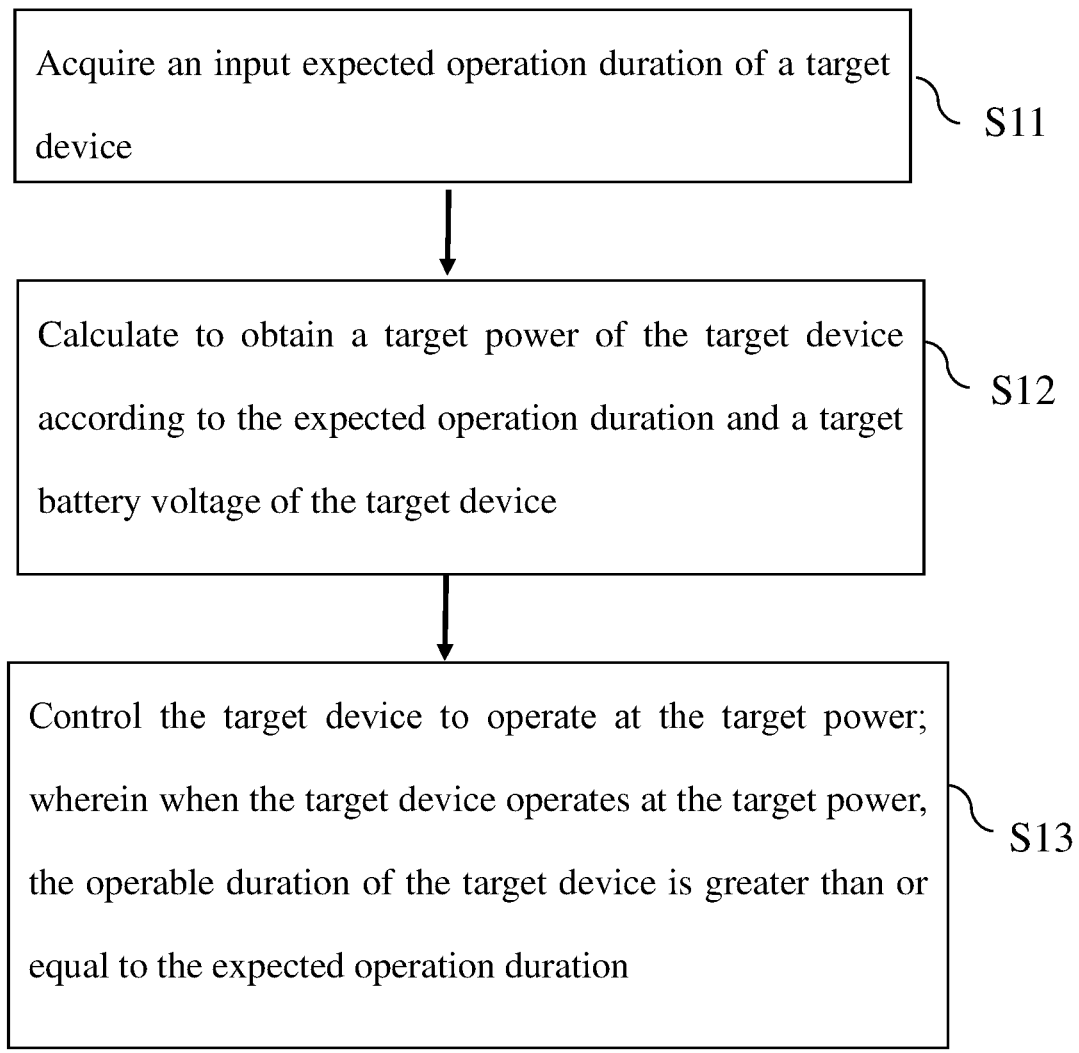
FIG. 1 is a flow diagram of a method for controlling device operation according to an embodiment of the present application.

In the following description, for purposes of explanation and not limitation, specific details are set forth such as particular system structures and techniques in order to provide a thorough understanding of the embodiments of the present application. It will be apparent, however, to one skilled in the art that the present application may be practiced in other embodiments that depart from these specific details.

As used in this specification and the appended claims of the present application, the term "if" may be interpreted, depending on the context, as "when", or "upon", or "in response to a determination" or "in response to a detection". Similarly, the phrase "if it is determined" or "if a [described condition or event] is detected" may be interpreted contextually to mean "upon determining" or "in response to determining" or "upon detecting [described condition or event]" or "in response to detecting [described condition or event]".

Furthermore, in this specification and the appended claims of the present application, the terms "first," "second," "third," and the like are used for distinguishing between descriptions and are not to be construed as indicating or implying relative importance.

Reference throughout this specification of the present application to "one embodiment" or "some embodiments," or the like, means that a particular feature, structure, or characteristic described in connection with the embodiment is included in one or more embodiments of the present application. Thus, appearances of the phrases "in one embodiment," "in some embodiments," "in other embodiments," "in furthermore embodiments," or the like, in various places throughout this specification are not necessarily all referring to the same embodiment, but rather mean "one or more but not all embodiments" unless specifically stated otherwise. The terms "comprising," "including," "having," and variations thereof mean "including, but not limited to," unless otherwise specifically stated.

In order to explain the technical solutions described in the present application, the following description will be given by way of specific embodiments.

An embodiment of the present application provides a method for controlling device operation, and the execution subject of the method is a terminal device provided with a battery, such as a dimmable LED lamp provided with a battery, a color-temperature-variable illumination lamp, a camera, a video camera and other electronic devices.

In application, during use of a target device, it is often the case that a battery power supply is not sufficiently charged to support the required service time, resulting in a failure to carry out the work well on the basis of the target device.

For this purpose, an embodiment of the present application provides a method for controlling device operation, which can well solve the problem that a battery power supply is not sufficiently charged to support the required service time, resulting in a failure to carry out the work well on the basis of the target device.

Referring to FIG. 1, FIG. 1 is a flow diagram illustrating implementation of a method for controlling device operation according to an embodiment of the present application. In the embodiment, the method for controlling device operation is used for controlling operation power of a device in a device operation process, so as to meet requirements of a user on usage of the device.

The method for controlling device operation provided by the present application is described exemplarily below by means of specific embodiments.

As shown in FIG. 1, the method for controlling device operation according to an embodiment of the present application includes the following steps:

S11: the input expected operation duration of a target device is acquired.

As an example of the present application, a target device refers to an electronic device that is configured with a battery and is capable of supporting the operation of the device on the basis of the battery, such as a dimmable LED lamp provided with a battery, a color-temperature-variable illumination lamp, a camera or a video camera.

The expected operation duration refers to duration that the user expects the target device to operate continuously with the support of the battery. For example, a user may expect a camera configured with a battery to last for 2 hours.

In the embodiment, in order to understand the requirement of the user for using the device, so as to control the operation of the device according to the requirement of the user, so that the user can carry out the work on the basis of the target device, and the expected operation duration, input by the user, of the target device is first acquired.

It can be understood that the user may input the expected operation duration by means of an inputting assembly on the target device, or the user may input the expected operation duration of the target device by means of a device communicatively connected to the target device, or the expected operation duration may be determined according to a scene where the target device is located.

Exemplarily, the target device is a camera, and the user selects an expected operation duration desired by the user from preset working times of the camera by means of a switch key and a selection key on the camera, for example, if "2 hours" is selected from the working times "1 hour", "2 hours", and "3 hours", the 2 hours is the input expected operation duration of the target device.

In an embodiment, scene feature information of the target device is acquired, the scene feature information is matched with a plurality of pieces of reference scene feature information recorded in a user image of a target object, and the operation duration of the target device corresponding to the reference scene information of which the matching degree exceeds a preset matching degree is used as the expected operation duration.

In the embodiment, since the user may use the target device in different scenes and may have different usage habits, for example, in a scene A, the target device may be set to operate for 2 hours, so that the expected operation duration may be obtained according to the user portrait of the user and the scene information where the target device is located.

As an example of the present application, the expected operation duration corresponding to the target device used by the user in different scenes is recorded in the user portrait.

In the embodiment, the scene information where the target device is located is matched with the set scene information recorded in the user portrait, and the expected operation duration corresponding to the successfully matched set scene information is used as the expected operation duration corresponding to the scene information where the target device is located.

In an embodiment, the expected operation duration of the target device is determined according to an adjusted brightness change value.

In the embodiment, the target device is a dimmable illumination device, such as a dimmable lamp. In order to enable the illumination device to illuminate for a longer time, an adjusted brightness change value is acquired, and the expected operation duration of the target device is determined according to the brightness change value and adjusted brightness.

It can be understood that the corresponding expected operation duration is preset with regard to different brightness change values and adjusted brightness.

S12: the target power of the target device is obtained by calculation according to the expected operation duration and the target battery voltage of the target device.

As an example of the present application, the target battery voltage is used to describe the charge carried in a battery that is capable of supporting the operation of the target device. For example, the battery of a camera carries 80% of the electricity, and the voltage is 18 v.

The target power refers to the operation power corresponding to the target device when the operable duration of the target device is greater than or equal to the expected operation duration.

For example, the expected operation duration is 14000 seconds, the operable duration of the target device is 10000 seconds when the battery is fully charged and the operation power of the target device is 20 W, and the operable duration of the target device is 14100 seconds when the battery is fully charged and the operation power of the target device is 15 W, so 15 W is the target power.

It can be understood that the target power may be the current operation power of the target device, the power adjusted down from the current operation power, or the power adjusted up from the current operation power.

In the embodiment, since the target device operates at different powers, the target device, supported by the target battery voltage, may operate for different durations, therefore, in order to ensure that the continuous operation duration of the device is greater than or equal to the expected operation duration, so as to facilitate the user to carry out the work on the basis of the target device, the target power of the target device needs to be obtained by calculation according to the expected operation duration and the target battery voltage of the target device.

It can be understood that, on the basis of the target battery voltage, the operable duration of the target device is determined when the target device is at different powers, then according to the expected operation duration and the operable duration of the target device at different powers, the power of the target device when the operable duration is greater than or equal to the expected operation duration is determined, and the power is taken as the target power.

S13: the target device is controlled to operate at the target power, wherein when the target device operates at the target power, the operable duration of the target device is greater than or equal to the expected operation duration.

In an embodiment, in order to enable the target device to continuously operate so as to achieve a service duration that a user expects the device to operate, after the target power of the target device is obtained by calculation according to the expected operation duration and the target battery voltage of the target device, the target device is controlled to operate at the target power, so that when the target device operates at the target power, the operable duration of the target device is greater than or equal to the expected operation duration.

It can be understood that when the target device is controlled to operate at the target power, the current device operation power of the target device may be maintained, the power may be adjusted down from the current device operation power, and the power may also be adjusted up from the current device operation power.

Exemplarily, the target power is 14 W, and the current device operation power of the target device is 18 W, in order to enable the operable duration of the target device to be greater than or equal to the expected operation duration, the device operation power of the target device is adjusted from 18 W to 14 W, and the target device is controlled to operate at the device operation power of 14 W, so that the target device can operate continuously for a longer time under the support of the battery, and the service is better provided.

According to the method for controlling the device operation provided by the an embodiment of the present application, the input expected operation duration of the target device is acquired, the target power of the target device is obtained by calculation according to the expected duration and the target battery voltage of the target device, so that the expected operation duration of the target device in operation at the target power can be controlled well, and the requirement of the user for the required service time of the target device in continuous operation is met.

In an embodiment, after the target power of the target device is obtained by calculation according to the expected operation duration and the target battery voltage of the target device, a target operation power change value of a power-adjustable component is determined, and the target device is controlled to operate at the target power according to the target operation power change value.

In application, the power-adjustable component includes, but is not limited to, an adjustable resistor.

With reference to FIG. 2, in an embodiment of the present application, a specific implementation of calculating to obtain the target power of the target device according to the expected operation duration and the target battery voltage of the target device includes:

S21: a target discharge curve is selected, according to the expected operation duration and the target battery voltage, from at least one discharge curve established in advance; wherein the at least one discharge curve is used for representing the relation between a device operation duration and a battery voltage, and each discharge curve corresponds to one device operation power.

In the embodiment, in order to better control the operation of the target device so that the remaining working time of the target device can be more efficiently controlled, at least one discharge curve is established in advance so as to represent the relation between the device operation duration and the battery voltage of the target device at each device operation power by each discharge region. Then, according to the expected operation duration and the target battery voltage, a target discharge curve is selected from at least one discharge curve established in advance, namely the device operation power corresponding to the target discharge curve is selected from the device operation power corresponding to each discharge curve.

It can be understood that since the target device is operated on the basis of the power supplied by the battery, the battery will continue to discharge as the voltage of the battery decreases during operation of the target device, and since each discharge curve will include a relation between the battery voltage, which is greater than the current voltage of the battery, and the device operation duration, the part of data is not available for reference in the selection of the discharge curve. Therefore, when the target discharge curve is selected, according to the expected operation duration and the target battery voltage, from at least one discharge curve established in advance, valid data in each discharge curve is determined on the basis of the target battery voltage in combination with the battery voltage described in each discharge curve, then a discharge curve containing the device operation duration greater than or equal to the expected operation duration is determined in combination with the expected operation duration and the device operation duration described in the valid data of each discharge curve, and the discharge curve is taken as the target discharge curve.

S22: the device operation power corresponding to the target discharge curve is determined as the target power.

In the embodiment, when the target device operates at the device operation power corresponding to the target discharge curve, the operable duration is greater than or equal to the expected operation duration, and therefore, after the target discharge curve is selected, the device operation power corresponding to the target discharge curve is determined as the target power, so as to control the target device to operate at the device operation power corresponding to the target discharge region.

In an embodiment of the present application, a specific implementation of selecting, according to the expected operation duration and the target battery voltage, the target discharge curve from at least one discharge curve established in advance includes:

with regard to each discharge curve in the at least one discharge curve, the target battery voltage is taken as a node, the discharge curve is divided into a first segment in which the battery voltage is greater than the target battery voltage and a second segment in which the battery voltage is less than the target battery voltage; and if the length of the device operation duration covered by the second segment is greater than or equal to the expected operation duration, the discharge curve is determined as a discharge curve to be selected.

The discharge curve to be selected with the maximum difference between the corresponding device operation power and the current operation power of the target device from the determined discharge curves to be selected is selected as the target discharge curve.

In the embodiment, since each discharge curve can be the relation between the device operation duration and the battery voltage from the maximum voltage of the battery to the minimum voltage at the device operation power corresponding to the discharge curve, and the voltage gradually decreases from the maximum voltage with the continuous discharge of the battery, in order to determine the target discharge curve according to the actual situation of the battery, each discharge curve is segmented according to the voltage of the target battery of the target device, so as to determine the valid data in each discharge curve, that is, the second segment, so as to determine whether the device operation duration with the length greater than or equal to the expected operation duration is covered in the second segment of each discharge curve, and if the length of the device operation duration covered by the second segment is greater than or equal to the expected operation duration, the discharge curve is determined as the discharge curve to be selected.

Figure 3A:
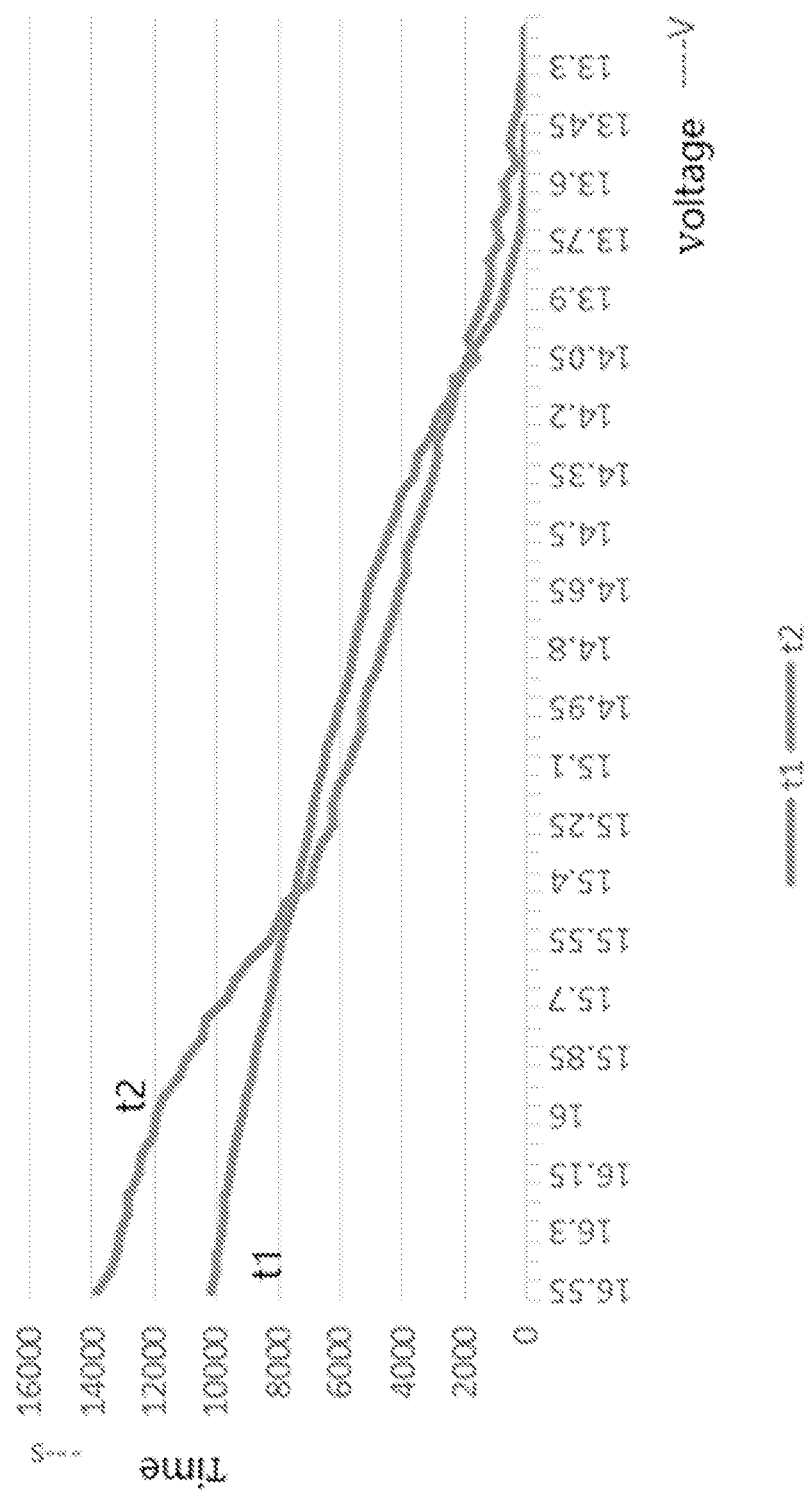
FIG. 3a is a schematic diagram of a discharge curve established in advance according to an embodiment of the present application.

Exemplarily, with reference to FIG. 3a, the target battery voltage is 16 v, and with 16 v as a node, the discharge curve t1 and the discharge curve t2 are divided into a left segment and a right segment, and the battery voltage on the left side of 16 v is greater than 16 v, which is the first segment, and the battery voltage on the right side of 16 v is less than 16 v, which is the second segment. In addition, the expected operation duration is 8000 s, and the second segments corresponding to the discharge curve t1 and the discharge curve t2 respectively cover the device operation duration with the length greater than or equal to the expected operation duration, so the discharge curve t1 and the discharge curve t2 are the discharge curves to be selected.

In addition, as a plurality of discharge curves to be selected with the lengths of the device operation durations which are covered by the second segment being greater than or equal to the expected operation duration are possible, in order to efficiently control the operation of the target device and avoid a large adjustment range, the discharge curve to be selected with the minimum difference between the corresponding device operation power and the current operation power of the target device is selected from the determined discharge curves to be selected to serve as the target discharge curve.

Exemplarily, with reference to FIG. 3a, the discharge curve t1 and the discharge curve t2 are both discharge curves to be selected, and the corresponding device operation powers are 20 W and 15 W, respectively, while the current operation power of the target device is 21 W. That is, the difference between the device operation power corresponding to the discharge curve t1 and the current operation power of the target device is 1 W, and the difference between the device operation power corresponding to the discharge curve t2 and the current operation power of the target device is 6 W, in order to efficiently control the operation of the target device, that is, in order to operate the target device at a high operation power and maintain a good state while satisfying the operation duration expected by the user, and to avoid a large power adjustment range, the discharge curve t1 is set as the target discharge curve.

In the embodiment of the present application, a specific implementation of selecting, according to the expected operation duration and the target battery voltage, the target discharge curve from at least one discharge curve established in advance includes:

with regard to each discharge curve in the at least one discharge curve, the target battery voltage is taken as a node, the discharge curve is divided into a first segment in which the battery voltage is greater than the target battery voltage and a second segment in which the battery voltage is less than the target battery voltage; if the length of the device operation duration covered by the second segment is greater than or equal to the expected operation duration, the discharge curve is determined as a discharge curve to be selected.

The discharge curve to be selected with the maximum difference between the corresponding device operation power and the current operation power of the target device from the determined discharge curves to be selected is selected as the target discharge curve.

Exemplarily, with reference to FIG. 3a, the discharge curve t1 and the discharge curve t2 are both discharge curves to be selected, and the corresponding device operation powers are 20 W and 15 W, respectively, while the current operation power of the target device is 21 W. That is, the difference between the device operation power corresponding to the discharge curve t1 and the current operation power of the target device is 1 W, and the difference between the device operation power corresponding to the discharge curve t2 and the current operation power of the target device is 6 W, thus, in order to enable the target device to operate continuously for a longer time, the discharge curve t2 is taken as a target discharge curve, the target device can operate for a period of time continuously after operating for the expected operation duration at the device operation power corresponding to the discharge curve t2, and service can be better provided for the user to carry out the work.

In an embodiment, if it is determined that the target discharge curve does not exist in each discharge curve in the at least one discharge curve established in advance, the discharge curve with the minimum difference between the length of the device operation duration covered by the second segment and the expected operation duration is taken as the target discharge curve.

Exemplarily, the length of the device operation duration covered by the second segment of the discharge curve t1 is 13000 seconds, the length of the device operation duration covered by the second segment of the discharge curve t2 is 10000 seconds, and the expected operation duration is 14000 seconds, that is, the difference between the length of the device operation duration covered by the second segment and the expected operation duration is 1000 seconds and 4000 seconds respectively corresponding to the discharge curve t1 and the discharge curve t2, so that the discharge curve t1 is taken as the target discharge curve in order to enable the target device to meet the operation duration expected by the user as much as possible.

In an embodiment, when determining whether the second segment of each discharge curve covers the device operation duration with the length greater than or equal to the expected operation duration, a table look-up method is utilized for determining, and the dichotomy is utilized for searching in the table look-up process to save time cost and reduce the burden of operation processing of the target device.

Specifically, when determining whether the second segment of one discharge curve covers the device operation duration with the length greater than or equal to the expected operation duration, the expected operation duration is compared with the intermediate device operation duration of the multiple device operation durations included in the second segment, if the expected operation duration is greater than the intermediate device operation duration, the comparison range is further narrowed, and the expected operation duration is continuously compared with the multiple device operation durations in the narrowed second segment until whether the second segment of the discharge curve covers the device operation duration with the length greater than or equal to the expected operation duration is determined.

Exemplarily, the expected operation duration is 8000 seconds, and the second segment of the discharge curve t1 includes 9 device operation durations of 8000 seconds, 7000 seconds, 6000 seconds, 5000 seconds, 4000 seconds, 3000 seconds, 2000 seconds, 1000 seconds, and 0 second. The expected operation duration 8000 seconds is compared with the intermediate device operation duration 4000 seconds, 8000 seconds is longer than 4000 seconds, then the expected operation duration 8000 seconds is further compared with the intermediate device operation duration in 8000 seconds, 7000 seconds, 6000 seconds, 5000 seconds and 4000 seconds, namely the expected operation duration 8000 seconds is compared with 6000 seconds, due to the fact that 8000 seconds is longer than 6000 seconds, and further the comparison range is reduced until the expected operation duration 8000 seconds is determined to be equal to the device operation duration 8000 seconds, namely, the device operation duration with the length greater than or equal to the expected operation duration is covered in the second segment of the discharge curve t1.

In an embodiment, each discharge curve corresponds to one device operation power, so before the discharge curve to be selected is determined, the current device operation power of the target device is acquired first, it is determined whether the second segment of the discharge curve corresponding to the current device operation power covers a device operation duration of which the length is greater than or equal to the expected operation duration, and if the length of the device operation duration covered by the second segment is greater than or equal to the expected operation duration, the discharge curve corresponding to the current device operation power is taken as the discharge curve to be selected.

Further, the current device operation power is reduced by a preset power value to obtain a reduced device operation power, whether a second segment of a discharge curve corresponding to the reduced device operation power covers a device operation duration with the length greater than or equal to the expected operation duration is determined, and if the length of the device operation duration covered by the second segment is greater than or equal to the expected operation duration, the discharge curve corresponding to the reduced device operation power is used as a discharge curve to be selected. In the same way, all the discharge curves to be selected of which the lengths of the device operation durations covered by the second section are longer than or equal to the expected operation duration are determined from the at least one discharge curve established in advance.

In the embodiment, the preset power value may be set in advance according to actual demands.

In an embodiment, the current device operation power of the target device may be obtained by calculation by collecting the output voltage and output current of the battery.

In an embodiment of the present application, the at least one discharge curve is established by the following mode:
  the first discharge curve and the second discharge curve which are established in advance are acquired, and the device operation power corresponding to the first discharge curve is different from the device operation power corresponding to the second discharge curve.

At least one third discharge curve is established according to the first discharge curve and the second discharge curve, the device operation power corresponding to the at least one third discharge curve is located between the device operation power of the first discharge curve and the device operation power of the second discharge curve.

The first discharge curve, the second discharge curve and the at least one third discharge curve are determined as at least one discharge curve.

In the embodiment, when a discharge curve is established, in order to obtain a battery discharge curve at each device operation power, a large amount of data often needs to be collected, and the large amount of data occupies a large amount of memory of a processor, which is easy to cause the processor to be unable to work normally, for example, when a discharge curve is established, the collected large amount of data occupies memory space in a microcontroller unit (MCU) of an illumination device, which is easy to cause the illumination device to be unable to work normally, thus, in order to avoid that the memory of the processor of the target device is largely occupied, the first discharge curve and the second discharge curve which are established in advance are acquired, and then at least one third discharge curve is established on the basis of the first discharge curve and the second discharge curve.

It can be understood that the first discharge curve and the second discharge curve are established by collecting the discharge data of the battery, and the third discharge curve is obtained by calculation on the basis of the first discharge curve and the second discharge curve which are established in advance, so that when the discharge curve is established, a plurality of discharge curves may be obtained without collecting a large amount of discharge data of the battery or occupying the memory, and a data reference basis is provided for controlling device operation.

Figure 3B:
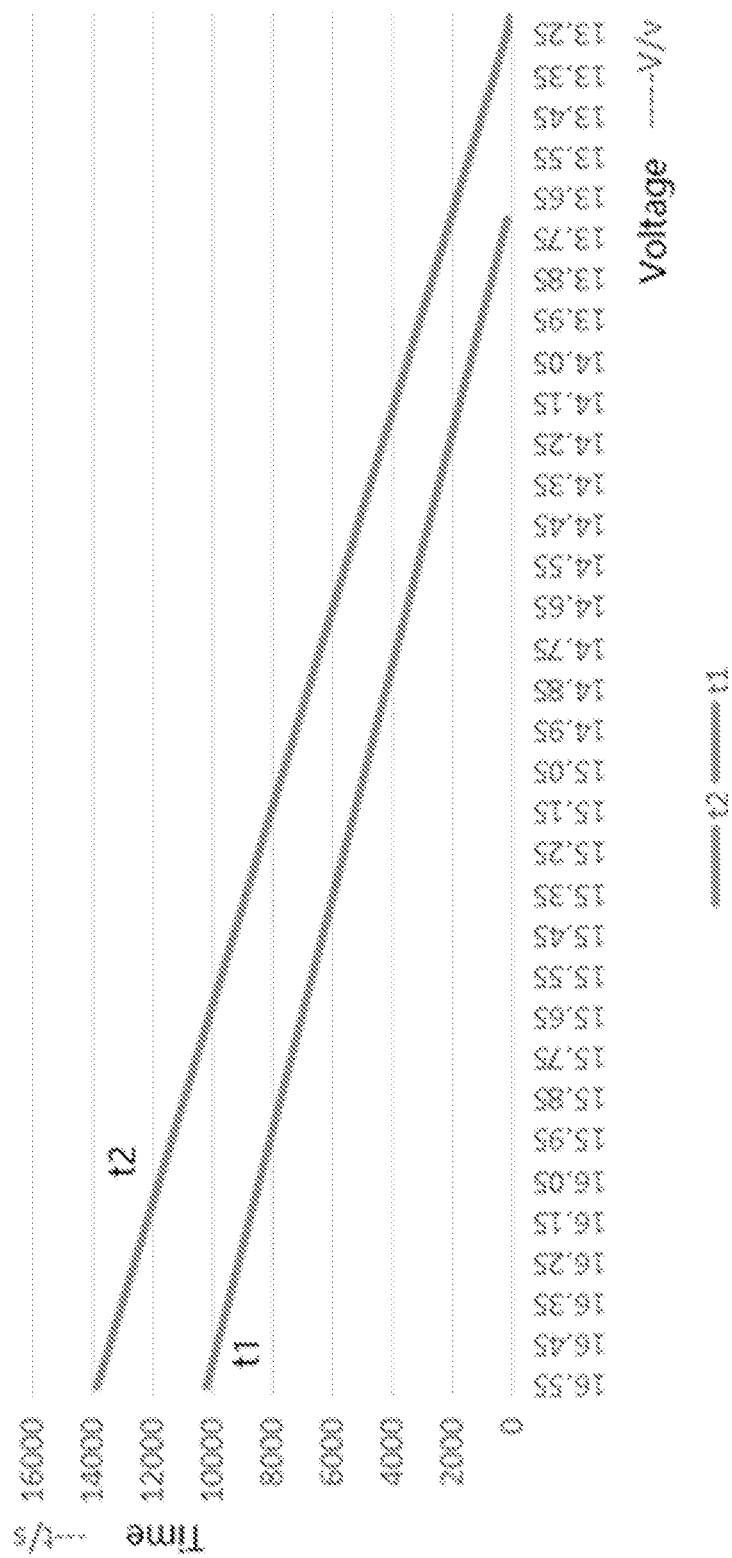
FIG. 3b is a schematic diagram of a discharge curve established in advance according to an embodiment of the present application.
Figure 3C:
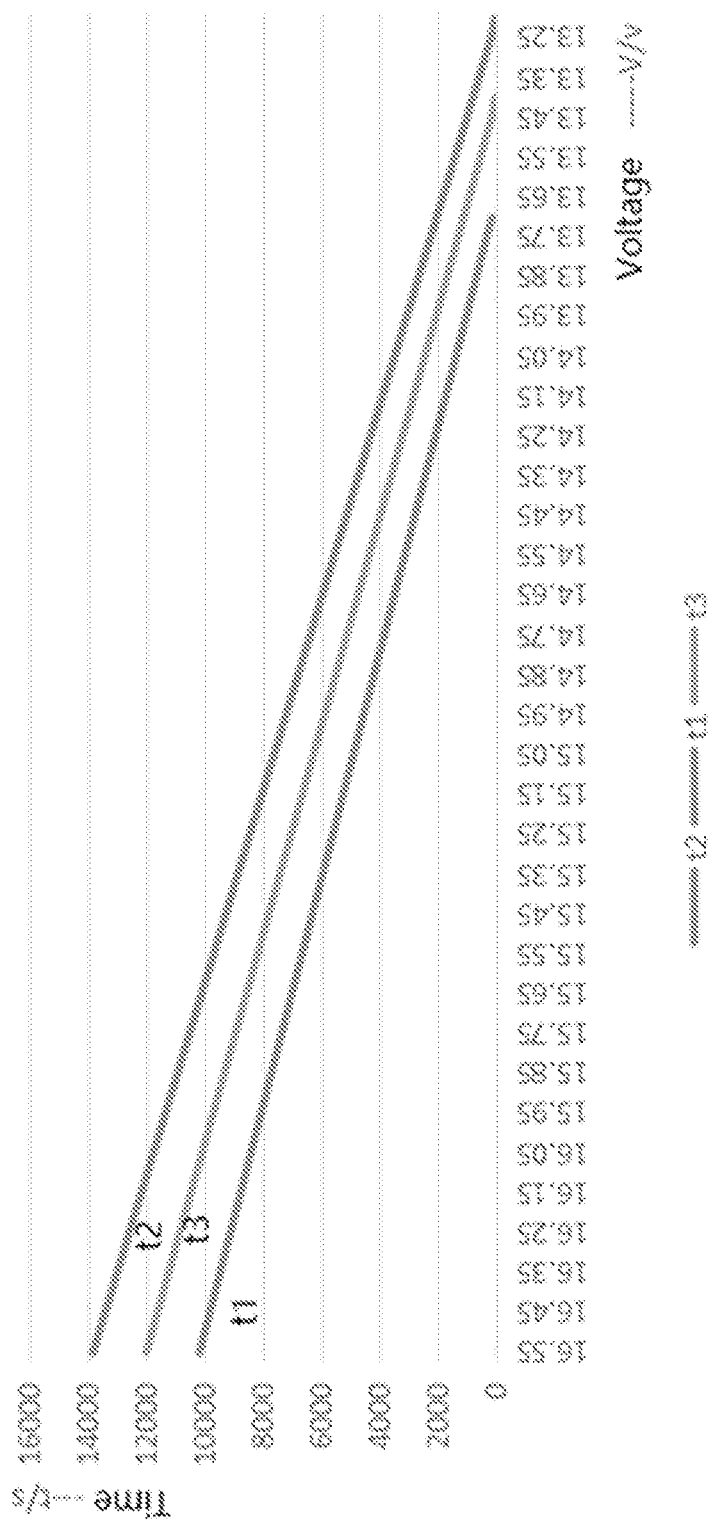
FIG. 3c is a schematic diagram of a discharge curve established in advance according to an embodiment of the present application.

Exemplarily, with reference to FIG. 3b, the discharge curve t1 and the discharge curve t2 which are established in advance and correspond to different device operation powers are acquired, and then with reference to FIG. 3c, the discharge curve t3 is established on the basis of the discharge curve t1 and the discharge curve t2.

For example, the discharge curve is represented by a linear formula s=kv+b, wherein k is a slope, v is a battery voltage, and b is a set constant.

From s=kv+b, data of two points t1 and t2 of 20 W and 15 W in FIG. 3b at the same voltage v is obtained, an intermediate time value t3=(t1+t2)/2 at the point is obtained, in the same way, n intermediate time values t(n) are obtained, and a v-t linear curve of the intermediate power, such as the discharge curve t3 in FIG. 3c, may be obtained by connecting all the points.

In an embodiment, linear slopes which respectively correspond to the first discharge curve and the second discharge curve are determined according to the first discharge curve and the second discharge curve; and at least one third discharge curve is established according to the first discharge curve, the second discharge curve and the preset linear formula.

In an embodiment, since the initial discharge curve of the battery is not linear, fitting of the discharge curves with other powers is not very friendly, the existing discharge curve is further subjected to linear fitting processing, the time displayed linearly is smoother when shown externally, and poor user experience caused by large displayed time hopping amplitude is avoided.

Exemplarily, with reference to FIG. 3a, according to the collected discharge data corresponding to the battery when the target device operates at the device operation powers 20 W and 15 W, respectively, the discharge curve t1 and the discharge curve t2 which are not linear are established. Further, in order to make the operable duration of the target device smoother at the time of display, the discharge curve t1 and the discharge curve t2 are subjected to linear fitting processing, and then the discharge curve t1 and the discharge curve t2 as shown in FIG. 3b are obtained.

In an embodiment, in order to facilitate a user to know the operable duration of the target device, so as to select the expected operation duration, after the target power of the target device is obtained by calculation according to the expected operation duration and the target battery voltage of the target device, and the remaining operation duration of the target device is determined according to the current voltage of the battery and the target power, and is displayed in a set manner.

In the embodiment, the set manner may be displayed by a display screen connected to the target device.

In an embodiment of the present application, after the target device is controlled to operate at the target power, the method further includes that:

the voltage change value of the battery of the target device is acquired at intervals of a specified duration.

If the voltage change value is greater than a set threshold value, the remaining operation duration of the target device is determined according to the current voltage of the battery and the target power, and the remaining operation duration is displayed in a set manner.

As an example of the present application, the specified duration may be preset according to actual demands. For example, the specified duration is set to 1 second, that is, in every specified duration, a preset data acquisition program is operated once to acquire the voltage change value of the battery of the target device.

The set threshold value may be preset according to actual demands.

In the embodiment, in order to facilitate the user to conveniently control the operation of the target device, after the target device is controlled to operate at the target power, the voltage change value of the battery of the target device is collected at intervals of every specified duration, the collected voltage change value is compared with the set threshold, and when the voltage change value is greater than the set threshold, the remaining operation duration of the target device is determined according to the current voltage of the battery and the target power, and the remaining operation duration is displayed in a set manner.

It can be understood that, since it can be known how long the battery can support the target device to operate at the target power when the current voltage of the battery of the target device is collected, the remaining operation duration of the target device may be determined according to the current voltage of the battery and the target power.

In application, in order to collect the discharge data of the battery, an interface for calculating the output voltage and the output current of the battery is arranged in advance, so that a preset data collecting program can collect the discharge data of the battery.

In an embodiment, a discharge curve corresponding to the target power is obtained according to the target power, and then the remaining operation duration of the target device is determined according to the current voltage of the battery and the discharge curve corresponding to the target power.

In an embodiment, after the remaining operation duration is determined, the remaining operation duration is compared with a preset operation duration, and if the remaining operation duration is less than or equal to the preset operation duration, the target device is switched off.

Exemplarily, after the remaining operation duration of the target device is obtained, whether the remaining operation duration is 0 or not is determined, and if the remaining operation duration is 0, the target device is switched off.

In an embodiment of the present application, after the target device is controlled to operate at the target power, the method further includes:

if an operation instruction for canceling limitation of the operation duration of the target device is acquired, the step of controlling the target device to operate at the target power is exited.

As an example of the present application, the operation instruction is an instruction input by the user to operate the target device. For example, when the user operates and selects the "max" option of the target device, it indicates that the limitation of the operation duration of the target device needs to be canceled.

In the embodiment, after the target device is controlled to operate at the target power, in order to improve the service experience of the target device, the user may need to cancel limitation of the operation duration of the target device, so that the target device may continue to operate at the other device operation power.

Exemplarily, the working time selection options of the target device include max, 1 hour, 2 hours, 3 hours, and 4 hours, wherein max represents cancellation of the limitation of the operation duration of the target device, and when the user operates the selection button of the target device to select the max option, the operation instruction for canceling the limitation of the operation duration of the target device is input by the user. Further, operation of the target device at the target power under the control is exited according to the operation instruction.

Figure 4:
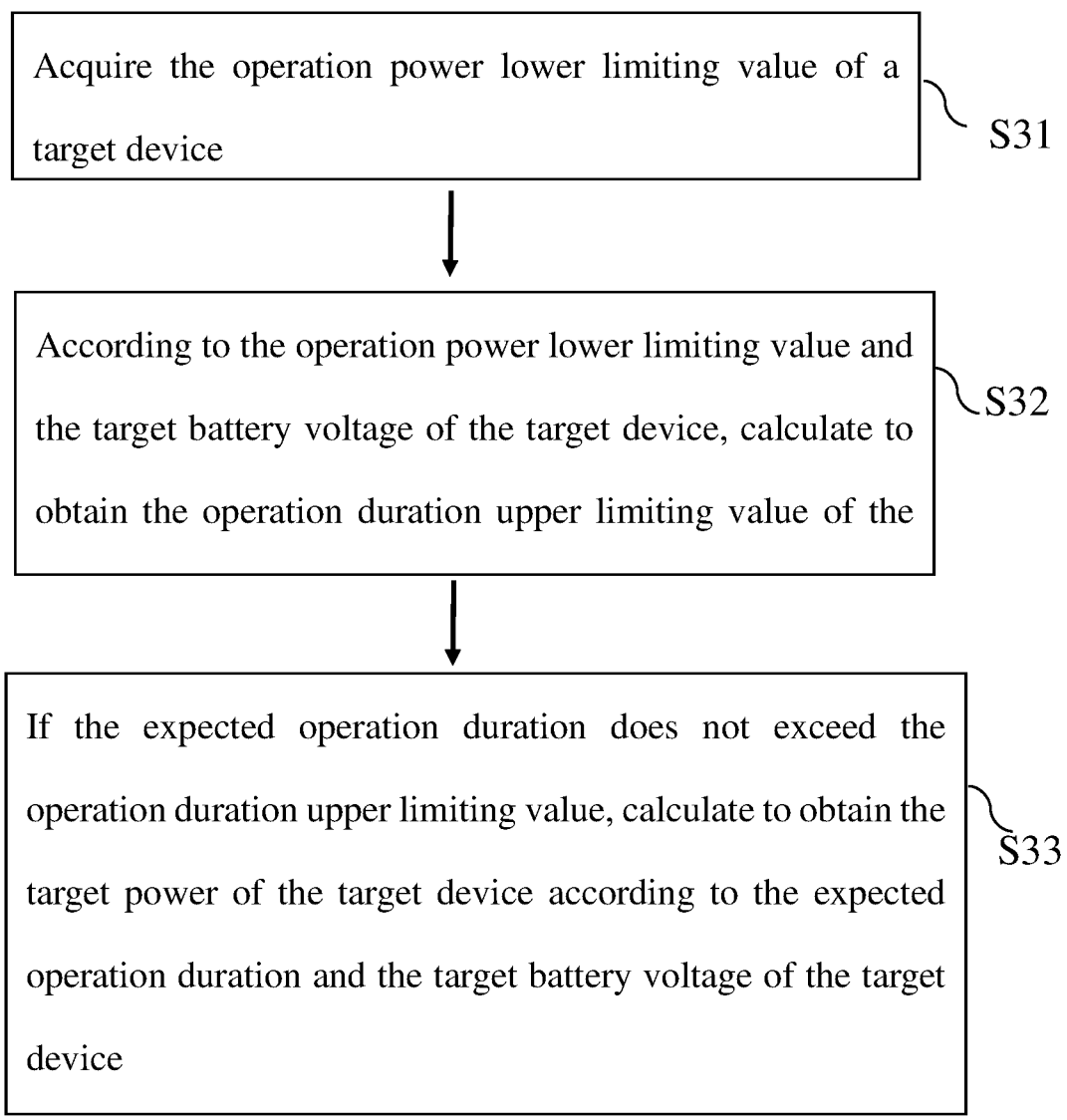
FIG. 4 is a flow diagram illustrating a specific implementation of step S12 of the method for controlling device operation according to another embodiment of the present application.

With reference to FIG. 4, in an embodiment of the present application, a specific implementation of calculating to obtain the target power of the target device according to the expected operation duration and the target battery voltage of the target device includes:

S31: The operation power lower limiting value of the target device is acquired.

S32: According to the operation power lower limiting value and the target battery voltage of the target device, the operation duration upper limiting value of the target device is obtained by calculation.

S33: If the expected operation duration does not exceed the operation duration upper limiting value, the target power of the target device is obtained by calculation according to the expected operation duration and the target battery voltage of the target device.

As an example of the present application, the operation power lower limiting value refers to a minimum device operation power corresponding to the target device capable of operating normally and providing a service.

The operation duration upper limiting value refers to the longest operable duration of the target device when the voltage of the battery of the target device is the target battery voltage and the target device operates at the operation power lower limiting value.

In the embodiment, since the battery of the target device may continuously consume the charge stored in the battery along with operation of the target device, so as to cause a voltage drop, and possibly make the electric quantity corresponding to the battery insufficient to support the target device to operate expected operation duration input by the user, when the expected operation duration is acquired, it is determined first that the operation duration of the target device, that is, the operation duration upper limiting value of the target device, can be supported by the battery of the target device when the target device operates at the minimum operation power at the target battery voltage. Then, the expected operation duration is compared with the operation duration upper limiting value to determine whether the expected operation duration is greater than the operation duration upper limiting value. If the expected operation duration does not exceed the operation duration upper limiting value, it indicates that the target device may continuously operate at the minimum device operation power to reach the duration expected by the user at the target battery voltage, so the target power of the target device is further obtained by calculation according to the expected operation duration and the target battery voltage of the target device, and the target device can operate at the target power. On the contrary, if the expected operation duration exceeds the operation duration upper limiting value, it indicates that the operable duration of the target device when operating at the minimum device operation power is less than the expected operation duration at the target battery voltage, and the requirement of the user for the target device to continuously operate for the expected operation duration cannot be met.

Exemplarily, the operation power lower limiting value of the target device is 15 W, the current voltage of the target device is 15 v, and the operable duration of the target device is calculated to be 2.5 hours when the target device operates at the device operation power of 15 W, while the expected operation duration is 4 hours, that is, the target device is not enough to operate for supporting the device operation duration expected by the user. On the contrary, if the expected operation duration is 2 hours, it indicates that the target device is enough to operate for the device operation duration expected by the user.

It can be understood that, if the expected operation duration is greater than the operation duration upper limiting value, the step of calculating to obtain the target power of the target device according to the expected operation duration and the target battery voltage of the target device and other steps are stopped form being executed.

It should be noted that, at the same target battery voltage, when the target device operates at different device operation powers, the corresponding operable durations are different.

In addition, since the device operation power of the target device is equal to the output power of the battery, when the target battery voltage of the target device is obtained, after energy still stored in the battery can be known from the target battery voltage, the operation duration upper limiting value of the target device may be obtained by calculation on the basis of the operation power lower limiting value and the target battery voltage of the target device.

It should be understood that, the sequence numbers of the steps in the foregoing embodiments do not imply an execution sequence, and the execution sequence of each process should be determined by functions and internal logic of the process, and should not constitute any limitation to the implementation process of the embodiments of the present application.

Figure 5:
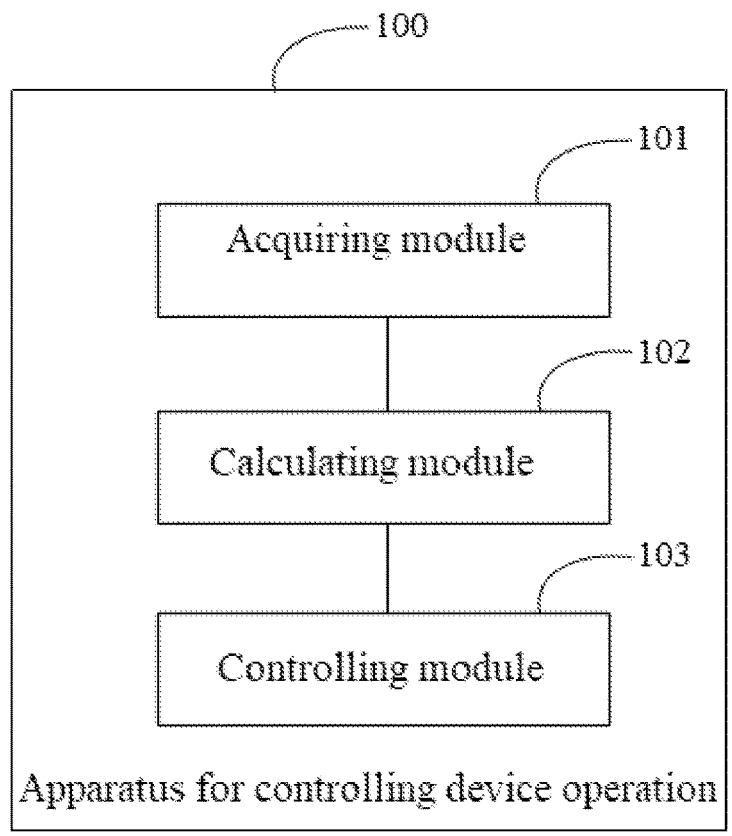
FIG. 5 is a structure diagram of an apparatus for controlling device operation according to an embodiment of the present application.

Corresponding to the method for controlling device operation in the foregoing embodiments, FIG. 5 illustrates a structural block diagram of an apparatus for controlling device operation according to an embodiment of the present application, and for convenience of description, only a part related to the embodiments of the present application is shown.

Referring to FIG. 5, the apparatus 100 includes:
an acquiring module 101, used for acquiring the input expected operation duration of a target device;
a calculating module 102, used for calculating to obtain the target power of the target device according to the expected operation duration and the target battery voltage of the target device; and
a control module 103, used for controlling the target device to operate at the target power, wherein when the target device operates at the target power, the operable duration of the target device is greater than or equal to the expected operation duration.

In an embodiment, the calculating module 102 is further used for selecting the target discharge curve from at least one discharge curve established in advance according to the expected operation duration and the target battery voltage; wherein at least one discharge curve is used for representing the relation between the device operation duration and the battery voltage, and each discharge curve corresponds to one device operation power.

The calculating module 102 is further used for determining the device operation power corresponding to the target discharge curve as the target power.

In an embodiment, the calculating module 102 is further used for, with regard to each discharge curve in the at least one discharge curve, taking the target battery voltage as a node, dividing the discharge curve into a first segment in which the battery voltage is greater than the target battery voltage and a second segment in which the battery voltage is less than the target battery voltage; and if the length of the device operation duration covered by the second section is greater than or equal to the expected operation duration, determining the discharge curve as a discharge curve to be selected.

The calculating module 102 is further used for selecting the discharge curve to be selected with the minimum difference between the corresponding device operation power and the current operation power of the target device from the determined discharge curves to be selected as the target discharge curve.

In an embodiment, the calculating module 102 is further used for, with regard to each discharge curve in the at least one discharge curve, taking the target battery voltage as a node, dividing the discharge curve into a first segment in which the battery voltage is greater than the target battery voltage and a second segment in which the battery voltage is less than the target battery voltage; and if the length of the device operation duration covered by the second section is greater than or equal to the expected operation duration, determining the discharge curve as a discharge curve to be selected.

The calculating module 102 is further used for selecting the discharge curve to be selected with the maximum difference between the corresponding device operation power and the current operation power of the target device from the determined discharge curves to be selected as the target discharge curve.

In an embodiment, the apparatus 100 further includes a curve establishing module.

The curve establishing module is used for acquiring the first discharge curve and the second discharge curve which are established in advance, and the device operation power corresponding to the first discharge curve is different from the device operation power corresponding to the second discharge curve; and according to the first discharge curve and the second discharge curve, at least one third discharge curve is established, the device operation power corresponding to the at least one third discharge curve is located between the device operation power of the first discharge curve and the device operation power of the second discharge curve; and the first discharge curve, the second discharge curve and the at least one third discharge curve are determined as at least one discharge curve.

In an embodiment, the apparatus 100 further includes a display module.

A duration display module is used for collecting the voltage change value of the battery of the target device at intervals of a specified duration; and if the voltage change value is greater than a set threshold value, the remaining operation duration of the target device is determined according to the current voltage of the battery and the target power, and the remaining operation duration is displayed in a set manner.

In an embodiment, the apparatus 100 further includes a cancellation control module.

The cancellation control module is used for exiting the step of controlling the target device to operate at the target power if the operation instruction for canceling limitation of the operation duration of the target device is acquired.

In an embodiment, the calculating module 102 is further used for acquiring the operation power lower limiting value of the target device; according to the operation power lower limiting value and the target battery voltage of the target device, the operation duration upper limiting value of the target device is obtained by calculation; and if the expected operation duration does not exceed the operation duration upper limiting value, the target power of the target device is obtained by calculation according to the expected operation duration and the target battery voltage of the target device.

The apparatus for controlling device operation according to the embodiment is used for implementing any method for controlling device operation in the method embodiments, wherein the functions of each module may refer to corresponding descriptions in the method embodiments, and the implementation principle and technical effect are similar, which are not described herein again.

Figure 6:
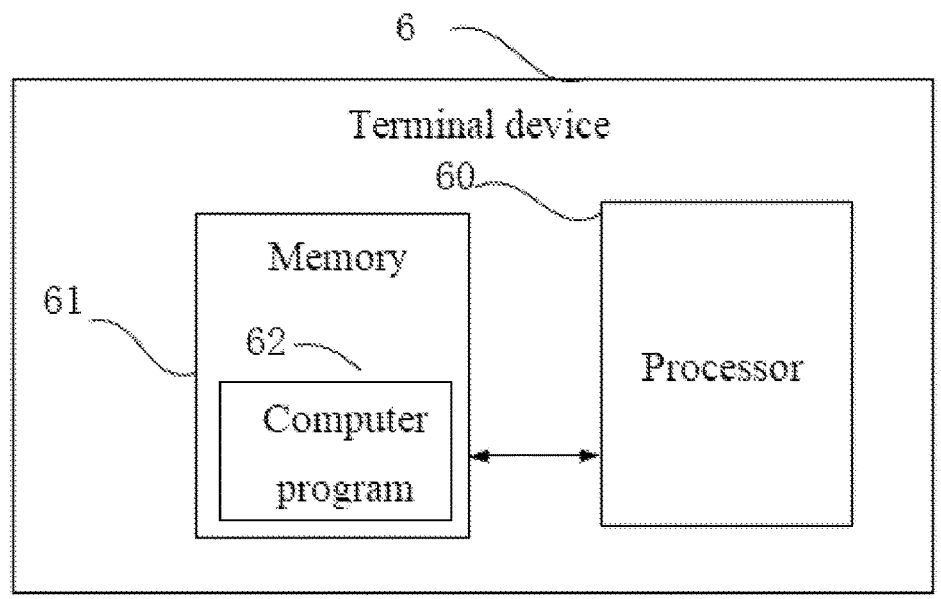
FIG. 6 is a structure diagram of a terminal device according to an embodiment of the present application.

FIG. 6 is a schematic structural diagram of a terminal device according to an embodiment of the present application. As shown in FIG. 6, the terminal device 6 of the embodiment includes: at least one processor 60 (only one processor is shown in FIG. 6), a memory 61, and a computer program 62 stored in the memory 61 and executable on the at least one processor 60, and the steps in any of the various method embodiments of controlling device operation described above are implemented by the processor 60 when executing the computer program 62.

The terminal device 6 may be a device provided with a battery, such as an illumination device, a video camera, a camera, a laptop and a palmtop. The terminal device may include, but is not limited to, a battery (not shown), a processor 60, and a memory 61. Those skilled in the art will appreciate that FIG. 6 is only an example of the terminal device 6, and does not constitute a limitation to the terminal device 6, and may include more or less components than those shown, or may combine some components, or different components, and may further include, for example, an input/output device, a network access device, and the like.

It can be understood that the terminal device is the target device in the method embodiments.

The processor 60 may be a central processing unit (CPU), and the processor 60 may also be another general purpose processor, a digital signal processor (DSP), an application specific integrated circuit (ASIC), a field-programmable gate array (FPGA) or another programmable logic device, a discrete gate or transistor logic device, a discrete hardware component and the like. A general purpose processor may be a microprocessor or the processor may be any conventional processor or the like.

The memory 61 may in some embodiments be an internal storage unit of the terminal device 6, such as a hard disk or a memory of the terminal device 6. The memory 61 may also be an external storage device of the terminal device 6 in other embodiments, such as a plug-in hard disk provided on the terminal device 6, a smart media card (SMC), a secure digital (SD) card, a flash card, and the like. Further, the memory 61 may also include both an internal storage unit of the terminal device 6 and an external storage device. The memory 61 is used for storing an operating system, an application program, a Boot Loader, data, and other programs, such as a program code of a computer program. The memory 61 may also be used to temporarily store data that has been output or is to be output.

It should be noted that, for the information interaction, execution process, and other contents between the above devices/units, the specific functions and technical effects thereof based on the same concept as those of the method embodiments of the present application can be specifically referred to the method embodiment part, and are not described herein again.

It should be clear to those skilled in the art that, for convenience and simplicity of description, the foregoing division of the functional units and modules is only used for illustration, and in practical applications, the above function distribution may be performed by different functional units and modules as needed, that is, the internal structure of the device is divided into different functional units or modules, so as to complete all or part of the above described functions. Each functional unit and module in the embodiments may be integrated in one processing unit, or each unit may exist alone physically, or two or more units are integrated in one unit, and the integrated unit may be implemented in a form of hardware, or in a form of a software functional unit. In addition, specific names of the functional units and modules are only used for distinguishing one functional unit from another, and are not used for limiting the scope of protection of the present application. For the specific working processes of the units and modules in the system, reference may be made to the corresponding processes in the foregoing method embodiments, which are not described herein again.

An embodiment of the present application further provides a terminal device, the terminal device includes: at least one processor, a memory and a computer program stored in the memory and capable of operating on at least one processor, and steps in any one of the above method embodiments are implemented when the processor executes the computer program.

An embodiment of the present application further provides a computer readable storage medium, the computer readable storage medium is stored with a computer program, and steps in each above method embodiment may be implemented when the computer program is executed by the processor.

An embodiment of the present application provides a computer program product, and when the computer program product operates on the terminal device, steps in each above method embodiment may be implemented when the terminal device executes the computer program product.

The integrated unit, if implemented in a form of a software functional unit and sold or used as a separate product, may be stored in a computer readable storage medium. On the basis of such understanding, all or part of the processes in the methods of the embodiments described above in the present application may be implemented by the computer program instructing related hardware, the computer program may be stored in a computer readable storage medium, and when the computer program is executed by the processor, the steps of the above method embodiments may be implemented. The computer program includes computer program codes, which may be in a form of source code, object code, an executable file or some intermediate forms and the like. The computer readable medium may include at least: any entity or apparatus capable of carrying the computer program codes to an apparatus/a terminal device, a recording medium, a computer memory, a read-only memory (ROM), a random access memory (RAM), electrical carrier signals, telecommunications signals, and software distribution media such as a USB flash disk, a mobile hard disk drive, a magnetic disk or an optical disk.

In the above embodiments, the description of each embodiment has its own emphasis, and reference may be made to the related description of other embodiments for parts that are not described or recited in any embodiment.

Those of ordinary skill in the art will appreciate that the various illustrative units and algorithm steps described in connection with the embodiments disclosed herein may be implemented as electronic hardware, or a combination of computer software and electronic hardware. Whether such function is implemented as hardware or software depends upon the particular application and design constraints imposed on the technical solution. Skilled artisans may implement the described function in varying ways for each particular application, but such implementation should not be interpreted as causing a departure from the scope of the present application.

In the embodiments provided in the present application, it should be understood that the disclosed apparatus/terminal device and method may be implemented in other ways. For example, the above-described apparatus/terminal device embodiments are merely illustrative, and for example, a module or a unit may be divided into only one type of logic function, and another division manner may be provided in actual implementation, for example, multiple units or components may be combined or integrated into another system, or some features may be omitted, or not executed. In addition, the shown or discussed mutual coupling or direct coupling or communication connection may be an indirect coupling or communication connection through some interfaces, devices or units, and may be an electrical, mechanical or other form.

The units described as separate components may or may not be physically separate, and components displayed as units may or may not be physical units, may be located in one position, or may be distributed on a plurality of network units. Some or all of the units can be selected according to actual needs to achieve the purpose of the solution of the embodiment.

The above embodiments are only used to illustrate the technical solutions of the present application, and not to limit the same; although the present application has been described in detail with reference to the foregoing embodiments, it should be understood by those of ordinary skill in the art that: the technical solutions described in the foregoing embodiments may still be modified, or some technical features may be equivalently replaced; and such modifications and substitutions do not do not make the essence of the corresponding technical solution separate from the spirit and scope of the technical solutions of the embodiments of the application, and they should be construed as being included in scope of protection of the present application.

The invention claimed is:

1. A method for controlling device operation, characterized by comprising:
  acquiring an expected operation duration of a target device;
  calculating to obtain a target power of the target device according to the expected operation duration and a target battery voltage of the target device;
  according to the expected operation duration and the target battery voltage, selecting a target discharge curve from at least one discharge curve established in advance, wherein the at least one discharge curve is used for representing a relation between a device operation duration and a battery voltage, and each discharge curve corresponds to a respective device operation power;
  determining the device operation power corresponding to the target discharge curve as the target power; and
  controlling the target device to operate at the target power, wherein when the target device operates at the target power, an operable duration of the target device is greater than or equal to the expected operation duration.

2. The method according to claim 1, characterized in that according to the expected operation duration and the target battery voltage, selecting the target discharge curve from at least one discharge curve established in advance comprises:
with regard to each discharge curve in the at least one discharge curve, taking the target battery voltage as a node, dividing the discharge curve into a first segment in which the battery voltage is greater than the target battery voltage and a second segment in which the battery voltage is less than the target battery voltage;
if a length of the device operation duration covered by the second segment is greater than or equal to the expected operation duration, determining the discharge curve as a discharge curve to be selected; and
selecting a discharge curve with a minimum difference between the corresponding device operation power and a current operation power of the target device from the determined discharge curves as the target discharge curve.

3. The method according to claim 1, characterized in that according to the expected operation duration and the target battery voltage, selecting the target discharge curve from at least one discharge curve established in advance comprises:
with regard to each discharge curve in the at least one discharge curve, taking the target battery voltage as a node, dividing the discharge curve into a first segment in which the battery voltage is greater than the target battery voltage and a second segment in which the battery voltage is less than the target battery voltage;
if a length of the device operation duration covered by the second segment is greater than or equal to the expected operation duration, determining the discharge curve as a discharge curve to be selected; and
selecting a discharge curve with a maximum difference between the corresponding device operation power and a current operation power of the target device from the determined discharge curves as the target discharge curve.

4. The method according to claim 1, characterized in that the at least one discharge curve is established by means of the following modes:
acquiring a first discharge curve and a second discharge curve which are established in advance, wherein the device operation power corresponding to the first discharge curve is different from the device operation power corresponding to the second discharge curve;
according to the first discharge curve and the second discharge curve, establishing at least one third discharge curve, wherein the device operation power corresponding to the at least one third discharge curve is located between the device operation power of the first discharge curve and the device operation power of the second discharge curve; and
determining the first discharge curve, the second discharge curve and the at least one third discharge curve as the at least one discharge curve.

5. The method according to claim 1, characterized in that after controlling the target device to operate at the target power, the method further comprises:
collecting a voltage change value of a battery of the target device at intervals of a specified duration; and
if the voltage change value is greater than a set threshold value, determining a remaining operation duration of the target device according to a current voltage of the battery and the target power, and displaying the remaining operation duration in a set manner.

6. The method according to claim 1, after controlling the target device to operate at the target power, the method further comprises:
if an operation instruction for canceling limitation of the operation duration of the target device is acquired, exiting the step of controlling the target device to operate at the target power.

7. The method according to claim 1, characterized in that calculating to obtain the target power of the target device according to the expected operation duration and the target battery voltage of the target device comprises:
acquiring an operation power lower limiting value of the target device;
according to the operation power lower limiting value and the target battery voltage of the target device, calculating to obtain an operation duration upper limiting value of the target device; and
if the expected operation duration does not exceed the operation duration upper limiting value, calculating to obtain the target power of the target device according to the expected operation duration and the target battery voltage of the target device.

8. A terminal device, characterized by comprising a battery, a memory, a processor and a computer program stored in the memory and capable of operating on the processor, wherein when the processor executes the computer program, a method for controlling device operation is implemented, wherein the method comprises the steps as follows:
acquiring an expected operation duration of a target device;
calculating to obtain a target power of the target device according to the expected operation duration and a target battery voltage of the target device;
according to the expected operation duration and the target battery voltage, selecting a target discharge curve from at least one discharge curve established in advance, wherein the at least one discharge curve is used for representing a relation between a device operation duration and a battery voltage, and each discharge curve corresponds to a respective device operation power;
determining the device operation power corresponding to the target discharge curve as the target power; and
controlling the target device to operate at the target power, wherein when the target device operates at the target power, an operable duration of the target device is greater than or equal to the expected operation duration.

9. The terminal device according to claim 8, characterized in that according to the expected operation duration and the target battery voltage, selecting the target discharge curve from at least one discharge curve established in advance comprises:
with regard to each discharge curve in the at least one discharge curve, taking the target battery voltage as a node, dividing the discharge curve into a first segment in which the battery voltage is greater than the target battery voltage and a second segment in which the battery voltage is less than the target battery voltage;
if a length of the device operation duration covered by the second segment is greater than or equal to the expected operation duration, determining the discharge curve as a discharge curve to be selected; and selecting a discharge curve with a minimum difference between the corresponding device operation power and a current operation power of the target device from the determined discharge curves as the target discharge curve.

10. The terminal device according to claim 8, characterized in that according to the expected operation duration and the target battery voltage, selecting the target discharge curve from at least one discharge curve established in advance comprises:
with regard to each discharge curve in the at least one discharge curve, taking the target battery voltage as a node, dividing the discharge curve into a first segment in which the battery voltage is greater than the target battery voltage and a second segment in which the battery voltage is less than the target battery voltage;
if a length of the device operation duration covered by the second segment is greater than or equal to the expected operation duration, determining the discharge curve as a discharge curve to be selected; and
selecting a discharge curve with a maximum difference between the corresponding device operation power and a current operation power of the target device from the determined discharge curves as the target discharge curve.

11. The terminal device according to claim 8, characterized in that the at least one discharge curve is established by means of the following modes:
acquiring a first discharge curve and a second discharge curve which are established in advance, wherein the device operation power corresponding to the first discharge curve is different from the device operation power corresponding to the second discharge curve;
according to the first discharge curve and the second discharge curve, establishing at least one third discharge curve, wherein the device operation power corresponding to the at least one third discharge curve is located between the device operation power of the first discharge curve and the device operation power of the second discharge curve; and
determining the first discharge curve, the second discharge curve and the at least one third discharge curve as the at least one discharge curve.

12. The terminal device according to claim 8, characterized in that after controlling the target device to operate at the target power, the method further comprises:
collecting a voltage change value of a battery of the target device at intervals of a specified duration; and
if the voltage change value is greater than a set threshold value, determining a remaining operation duration of the target device according to a current voltage of the battery and the target power, and displaying the remaining operation duration in a set manner.

13. The terminal device according to claim 8, after controlling the target device to operate at the target power, the method further comprises:
if an operation instruction for canceling limitation of the operation duration of the target device is acquired, exiting the step of controlling the target device to operate at the target power.

14. The terminal device according to claim 8, characterized in that calculating to obtain the target power of the target device according to the expected operation duration and the target battery voltage of the target device comprises:
acquiring an operation power lower limiting value of the target device;
according to the operation power lower limiting value and the target battery voltage of the target device, calculating to obtain an operation duration upper limiting value of the target device; and
if the expected operation duration does not exceed the operation duration upper limiting value, calculating to obtain the target power of the target device according to the expected operation duration and the target battery voltage of the target device.

* * * * *